(12) United States Patent
Frantz

(10) Patent No.: US 7,726,235 B1
(45) Date of Patent: Jun. 1, 2010

(54) TOP COOKER APPARATUS

(75) Inventor: Howard Jay Frantz, Irvine, CA (US)

(73) Assignee: In-N-Out Burgers, Irvine, CA (US)

( * ) Notice: Subject to any disclaimer, the term of this patent is extended or adjusted under 35 U.S.C. 154(b) by 867 days.

(21) Appl. No.: 11/265,609

(22) Filed: Nov. 2, 2005

Related U.S. Application Data

(60) Provisional application No. 60/632,057, filed on Dec. 1, 2004.

(51) Int. Cl.
A47J 37/10 (2006.01)
F24C 3/00 (2006.01)

(52) U.S. Cl. .............................. 99/422; 99/349; 99/331; 99/378; 99/379; 99/390; 99/391; 99/392; 99/393; 99/394; 99/395; 99/396; 99/399; 99/376; 99/372; 99/375; 99/426; 99/377; 99/374; 126/39 H; 126/39 N; 126/39 J; 126/39 BA; 126/41 R; 219/524; 219/525; 219/450.1; 219/465.1

(58) Field of Classification Search .................... 99/422, 99/349, 331, 378–9, 390–6, 399, 426, 372, 99/375–7, 374; 126/39 H, 39 N, 39 J, 39 BA, 126/41 R; 219/524–5, 450.1, 465.1
See application file for complete search history.

(56) References Cited

U.S. PATENT DOCUMENTS

| 3,457,853 | A | * | 7/1969 | Morley ........................ 99/349 |
| 4,206,345 | A | * | 6/1980 | Maass et al. ................. 219/524 |
| 4,444,094 | A | | 4/1984 | Baker et al. |
| 4,567,819 | A | | 2/1986 | Adamson |
| 4,669,373 | A | | 6/1987 | Weimer et al. |
| 4,763,571 | A | | 8/1988 | Bergling et al. |
| 5,197,377 | A | | 3/1993 | Jennings et al. |
| 5,386,762 | A | * | 2/1995 | Gokey ......................... 99/326 |
| 2005/0000957 | A1 | | 1/2005 | Jones et al. |

\* cited by examiner

*Primary Examiner*—Shawntina Fuqua
(74) *Attorney, Agent, or Firm*—Edward O. Ansell

(57) ABSTRACT

A relatively compact cooking assembly includes means for selectively positioning a cooking element above several cooking zones of a lower grill. In addition to a lower heated metal surface having several cooking zones, which may be delineated by vertical barriers or splash plates, the system includes an upper assembly comprising an upper member in which a radiant heating element is positioned, said assembly being adapted to fit over the back splash plate of the grill and extending the depth (back to front) of the grill, and further adapted to be raised or lowered and selectively raised or lowered as well as positioned by a sliding motion above a designated zone in predetermined sequence.

6 Claims, 2 Drawing Sheets

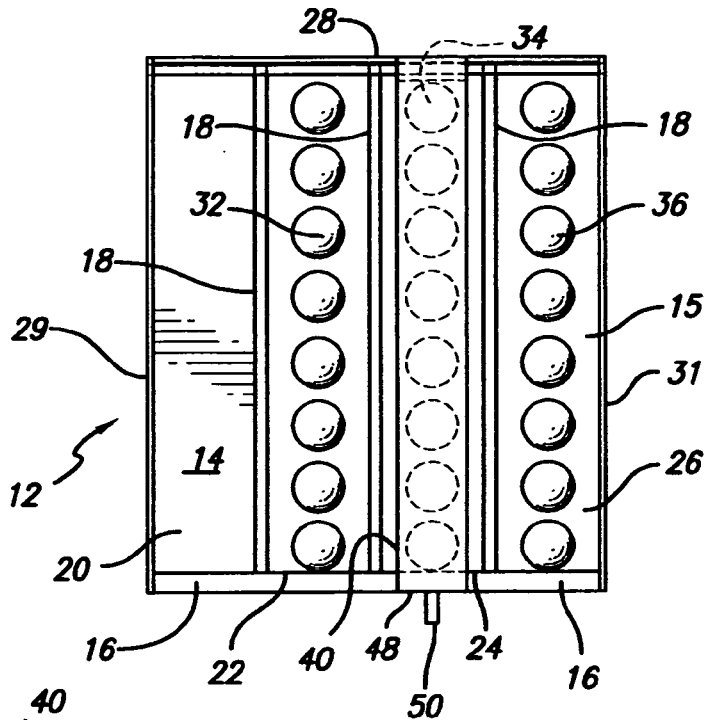
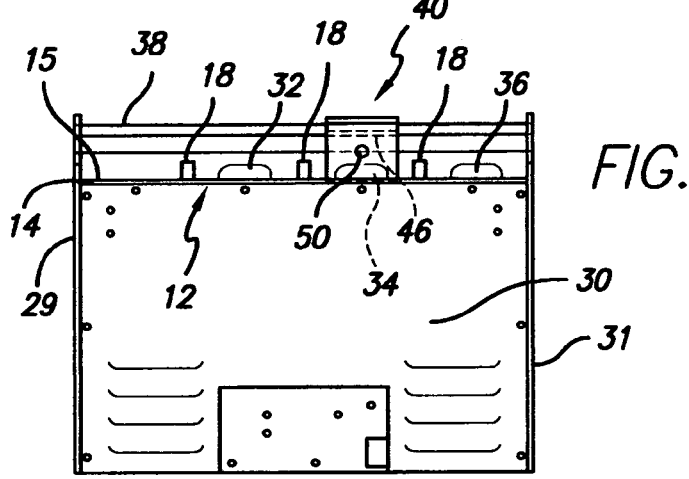
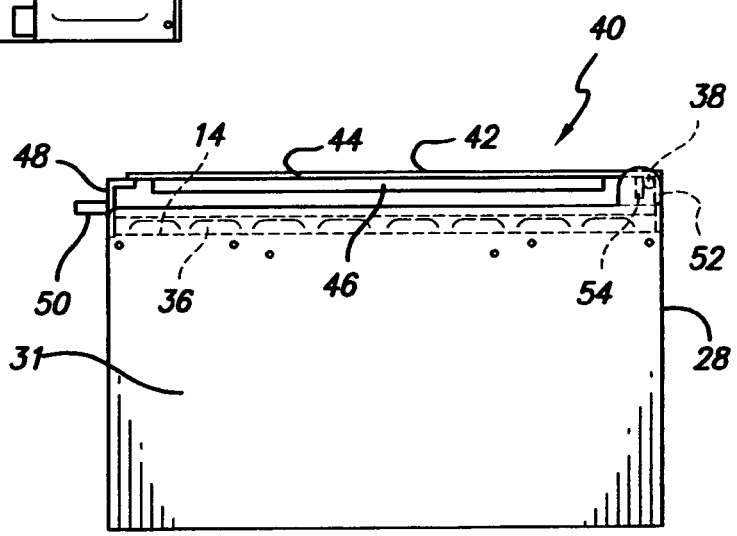

TOP COOKER APPARATUS

CROSS-REFERENCE TO RELATED APPLICATIONS

This application claims the benefit of Provisional Application Ser. No. 60/632,057, filed Dec. 1, 2004, the contents of which are incorporated herein by reference.

FIELD OF THE INVENTION

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

The present invention relates generally to two-sided cooking of food products, and more specifically to a method and system employing an existing grill which enables safe, sanitary and efficient two-sided cooking of food products such as hamburger patties.

BACKGROUND OF THE INVENTION

Two-sided cooking has become a popular method in recent years for cooking hamburger patties and other foods. Cooking time can be significantly reduced, when compared to conventional one-sided cooking, thereby permitting quick and efficient preparation of customer orders. There are several methods of top cooking of food products, the bottom of which is positioned on a heated flat metal surface, hereinafter interchangeably referred to as a grill or griddle. In one method, a hot platen is lowered onto the food, often via a hinged clamshell mechanism. The contact between the top of the patty and the heated platen cooks the top of the patty while the bottom rests directly upon the heated grill. The clamshell grill concept was pioneered by and is used in many high volume applications.

U.S. Pat. No. 4,444,094 discloses a conveyor type two-sided cooking apparatus in which the upper platen is power operated to a raised position. A conveyor advances a group of hamburger patties onto the lower platen and stops and the upper cooking platen is then allowed to drop by gravity onto the upper side of the group of patties on the lower platen. Platen stops are provided to control the minimum spacing of the upper platen relative to the lower platen during cooking, to prevent excessive compaction of the cooked patties. After the patties are cooked on both sides, the upper platen is power operated back to its raised position generally paralleling the lower platen and the conveyor is then operated to move the cooked patties off the lower cooking platen. Such conveyor type two-sided cooking apparatus are special purpose machines usable only for cooking certain food products such as hamburger patties that can be advanced by a conveyor onto and off from the lower cooking platen and they are not adapted to alternative use as a single surface grill.

U.S. Pat. No. 4,567,819 relates to a front loading and unloading grill apparatus for two-sided grilling of hamburger patties. The grill apparatus includes upper and lower cooking platens, a patty support panel at the front of the lower cooking platen and an endless conveyor for advancing uncooked patties from the patty support panel onto the lower cooking platen. When the patties are cooked, the conveyor operates in reverse and the cooked patties are discharged to a cooked patty receiver at the front side of the grill apparatus.

Another method utilized to meet high volume requirement is to employ a chain-driven char-broiler where the top and bottom of each patty is exposed to open flame. And yet another method is to employ a radiant heat emitter which is lowered over the top of the patty, often via a hinged clamshell mechanism, to within a few inches of the meat. While there is no direct contact, the radiant heat cooks the top of the patty which the patty's lower surface rests directly on the hot grill.

Various clamshell type two-sided cooking apparatus have been made in which the upper cooking platen is mounted on a platen support arm for swinging movement about a horizontal axis between a lower cook position and a raised position, and automatically raised at the end of a timed cooking cycle. Some prior art clamshell grills, such as disclosed in U.S. Pat. Nos. 2,009,792; 4,008,067 and 4,165,682, use counterbalance means to assist raising of the upper platen and in U.S. Pat. No. 4,483,239 the upper platen is power operated to a raised position by a pneumatic cylinder at the end of a time cooking cycle. In some prior clamshell grills, the upper platen is pivotally mounted on the platen support arm for tilting movement about a horizontal axis relative to the platen support arm to rest the upper surface of the food products. In U.S. Pat. Nos. 2,632,379 and 4,483,239, the upper platen is rigid with the platen support arm and spacing of the upper platen relative to the lower platen during cooking is effected by vertically adjusting the pivot at the rear of the platen support arm and adjusting an arm stop at the distal end of the platen support arm.

U.S. Pat. No. 4,763,571 is another apparatus for two-sided cooking including a housing upon which is mounted a substantially horizontal lower platen assembly and one or more upper platen assemblies each mounted on respective pivotal support arms for movement between a lowered position and a raised position with respect to the lower platen. The apparatus includes mechanisms for maintaining a predetermined minimum spacing between the upper and lower platens for avoiding undue compaction of food products.

U.S. Pat. No. 4,669,373 is a device to be used in connection with an existing grill to permit two-sided cooking of hamburger patties or the like on a relatively limited basis. The device includes a cooking assembly having an electrically-powered cooking platen which can be selectively positioned on food products on the grill, having been configured for use in conjunction with, and for rocking movement on, commercially-sized restaurant grills.

U.S. Pat. No. 5,197,377 relates to an apparatus for two-sided cooking which comprises one or more upper housing assemblies attached to the rear of a conventional cooking grill to retrofit the grill for two-sided cooking. A plurality of lightweight platens are mounted in the upper housing which float relative thereto, thereby permitting the housing to be lowered to the grill surface so as to completely enclose the items to be cooked.

What is lacking in the above mentioned cooking systems is the ability to conveniently deploy or remove by manual manipulation the top cooking means from the proximity of a relatively large number of meat patties or the like to enable placement of cheese and buns, and possibly other condiments, on the side of a meat patty which has already been cooked, while the second side is being cooked on the griddle (hereinafter referred to as "capping").

Therefore, it is an object of the present invention to provide a method and apparatus for simultaneously preparing one or a plurality of individual hamburger sandwiches to individual order;

Another object is to provide a method and apparatus for capping the cooked upper surface of a hamburger patty while the lower surface is being cooked on a grill;

It is also an object of the present invention to provide an apparatus for the two-sided cooking of patties or the like wherein an upper radiant heating element may be moved horizontally to be selectively positioned in a stand-off relationship above items to be cooked arranged upon the surface of a heated grill surface.

A further object of the present invention is to provide a means for two-sided cooking of food products which is safe, sanitary and efficient, wherein exposure of the hot surfaces to the cook is absent.

And yet another object is to provide a method and apparatus enhancing the flavor and taste of hamburgers by precooking one surface of a meat patty before it is turned and cooked on the heated surface of a grill.

BRIEF SUMMARY OF THE INVENTION

The present invention includes a relatively compact cooking assembly which includes means for selectively positioning a cooking element above several cooking zones, of a lower grill. In addition to a lower heated metal surface having several cooking zones which may be delineated by vertical barriers or splash plates, the system includes an upper assembly comprising an upper member in which a radiant heating element is positioned, said assembly being adapted to fit over the back splash plate of the grill and extending the depth (back to front) of the grill, and further adapted to be selectively raised or lowered as well as positioned by a sliding motion above a designated zone in predetermined sequence.

Two-sided cooking of hamburger patties or other food products is achieved by positioning the assembly over a grill zone containing the patties at a predetermined spacing between the radiant heating element and the lower grill. In the present invention said spacing is maintained by the dimensions of front and rear leg supports that permit the top cooker assembly to slide above the lower grill surface, enabling the heater assembly to be raised or lowered and selectively positioned above the grill zones to radiate heat sufficient to maintain a predetermined temperature at the surface of the patties in the grill zone for a predetermined time. Thus, the configuration of the top cooker assembly with respect to the lower grill is such that exposure of the heated surfaces to a cook is absent.

BRIEF DESCRIPTION OF THE DRAWING

FIG. 2 is a top view of the sliding top radiant cooker positioned upon the lower heated grill for the practice of the method of the present invention;

FIG. 3 is a front view of system illustrated in FIG. 1; and

FIG. 4 is a side view of said cooking system showing the interrelationship between the sliding top radiant cooker and the lower heated grill.

DETAILED DESCRIPTION OF THE PRESENT INVENTION

Figure 1:
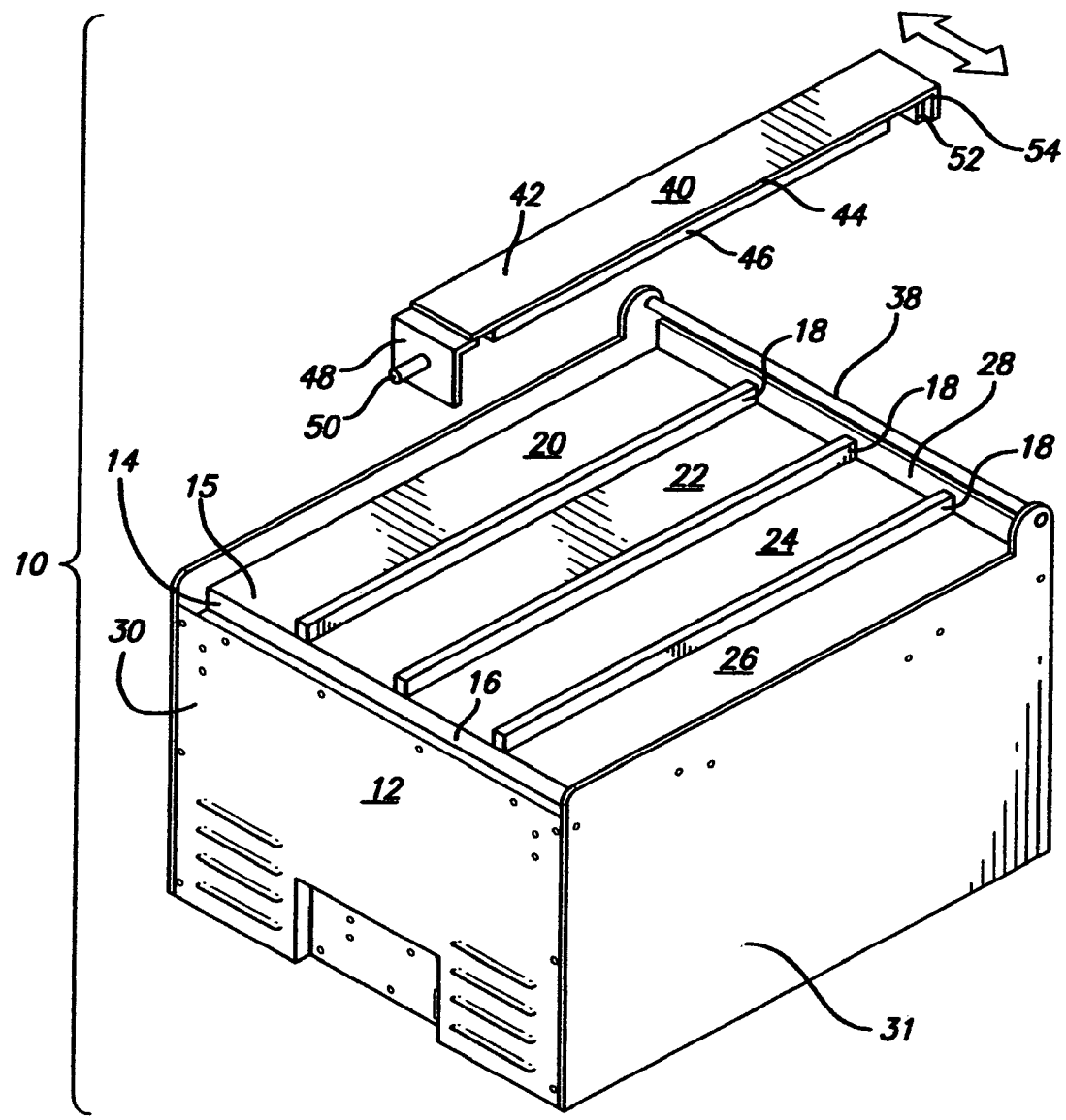
FIG. 1 is an exploded perspective view of the cooking system of the present invention displaying the construction of the sliding top radiant cooker and lower heated grill.

Turning to FIG. 1, the sliding top cooker system 10 comprises a lower heated grill assembly 12 and a top radiant heat cooker assembly 40, which operate cooperatively to achieve the aforementioned objects of the present invention. The lower grill assembly 12, sometimes referred to as a griddle, has a grill plate 14 located between a back splash plate 28 and a front plate 30. The grill plate 14 is manufactured from stainless steel although other materials could be utilized to give the cooking surface 15 superior wear characteristics and excellent heat transfer characteristics. The temperature of the grill plate surface 15 is provided by the heat of conduction from an electric heater plate (not shown) and may have a "belly guard" to prevent accidental contact with the grill plate 14 by an operator. The cooking surface 15 of the grill plate 14 contains first, second, third and fourth zones, 20, 22, 24 and 26 respectively, which optionally may be delineated by splash plates 18. A back splash plate 28 is positioned at the rear of the grill plate 14 above which is positioned a rear bar 38 connecting to the sides 29, 31 of the grill assembly 12 perpendicular to the back splash plate 28 and front plate 30 respectively, and a grease trough 16 is positioned between the front edge of the grill plate 14 and front plate 30.

The top radiant cooker assembly 40 comprises an upper plate 42, below which is positioned an insulation layer 44. A heating element 46, arranged below the insulation layer 44, is adapted to project radiant heat upon the upper surface of meat patties or other foods, as will later be described. The upper plate 42 is joined at its front edge by a downwardly distending front plate 48 from which a handle 50 projects to permit an operator to selectively position by sliding motion the top cooker assembly 40 above the zones 20, 22, 24, 26 of the grill plate surface 14. Distending downwardly from the upper plate 42 near its distal end is a guide plate 52, and at its distal edge a rear plate 54, the separation between the two parallel plates 52, 54 being larger than the rear bar 38 of grill 12.

As further shown in FIGS. 2, 3 and 4, the top cooker assembly 40 is positioned above the heated grill 12. The rear plate 52 and guide plate 54 of the top radiant cooker 40 fit over the bar 38 or back splash plate 28 of the grill and the top cooker assembly front plate 48 fits into the grease trough 16, so that an operator may slide the radiant top cooker assembly 40 from left to right or vice-versa in a manner which will be described hereinafter.

Turning specifically to FIG. 2, the top view of the system 10 in operation, the first grill plate zone 20 is shown where said assembly 40 is positioned when not deployed to cook. The second grill plate zone 22 hosts placement of the meat patties 32 thereon after removal of the assembly 40 subsequent to exposure of the patty top to the radiant heat of the top assembly 40 and bottom to the heated grill plate 14, ready to be turned over, the former top surface being exposed to the grill plate cooking surface 15 and the former lower surface being ready to be "capped", i.e., to have cheese and buns placed thereon.

The third grill plate zone 24 hosts placement of a new row of patties 34 to be cooked with the radiant cooker assembly 40 positioned over the top surfaces thereof, the bottoms being arranged on the grill plate cooking surface 15 of the lower heated grill 12. And the fourth grill zone 26 hosts meat patties 36 which, having been cooked and "capped," are ready to be removed and served.

In a typical operation, an operator places a row of meat patties or the like on the third zone 24 of the cooking surface 15 of the grill plate 14 of the heated lower grill 12, positioning the top cooker assembly 40 over the meat patties 34. The top surface of the meat patties are exposed to the radiant heat top cooker 40 sufficiently for the top surface to reach a temperature of at least 165 degrees Fahrenheit, the lower grill plate 14 being at a temperature of approximately 350 degrees Fahrenheit. The radiant top heater 40 is then moved to a resting position over the first grill zone 20. Having been subjected on their upper surface by said radiant heat, meat patties 32 are positioned in second grill zone 22, turned to subject the lower surface thereof to the heat of grill plate cooking surface 15 while being capped. Patties 36 at the fourth grill zone are ready to be pulled from the lower grill 12 and served, the grill cooking surface 15 then being scraped to dislodge and remove residue material therefrom.

In the preferred embodiment, the top heater does not hinge or pivot, always being heating element-down, parallel to the grill surface. The top cooker 40 is positioned 1.5 inches above the grill and is four to six inches wide and 28 to 34 inches deep. A lesser or greater height above the grill may be required, depending upon the dimensions of the items placed on the grill. A front plate or leg 48 may rest upon or in the grease trough 16 of the grill for stability. The grill splash plates 18 are spaced about six inches apart. The spatial relationship between the front plate 48 of the radiant cooking assembly 40 and the front plate 30 of the lower heated grill 12 is such that the radiant cooking assembly 40 may be manipulated by an operator cook without exposure of the heated surfaces 15, 46 to the cook, an important safety feature.

What has been shown is an upper radiant heating assembly 40 adapted to slideably fit above a lower heated grill 14 near the front plate 30 and the back splash plate 28 or bar 38 of the lower heated grill 12 to form a cooking system 10, wherein the heating element 46 of said radiant cooking assembly 40 is permanently faced downwardly and parallel to the grill plate surface 14 and which can be manipulated by an operator to be selectively slide horizontally over zones on the cooking grill surface 15 to subject the top of meat patties placed thereon to radiant heat for a predetermined time while the patty bottom is being cooked by the heated grill 12; to turn the patty over with the grill-cooked side up after the radiant cooking assembly has been removed from the zone in which the patty is positioned, capping the meat patty while the side previously subjected to radiant heat is cooked on the heated grill surface 15, and, thereafter, removing the cooked articles from the grill 12. It can be seen that the sequence of movement and placement of the patties can be varied among the four grill zones. By way of example, the meat patties to be initially exposed could be arranged in the first grill zone and the second grill zone utilized to turn and cap the patties. Alternatively, three (3) grill zones may be utilized, rather than the four shown.

While the preferred embodiment of the invention has been shown and described, it will be apparent to those skilled in the art that changes and modifications may be made thereto without departing from the spirit of the invention.

I claim:

1. A device for effecting two-sided cooking of food products comprising:

A horizontal grill plate having an upper cooking surface adapted to receive articles to be cooked, and a lower surface, a front edge and a rear edge, and first and second lateral edges, A vertical back splash plate positioned at said rear edge of said grill plate, A vertical front splash plate, A grease trough positioned between said front plate and said horizontal grill plate along the length of said front edge, First and second side plates joining said horizontal grill plate at said first and second lateral edges, A bar positioned above said horizontal grill plate at the rear edge and joining said first and second side plates, A plurality of vertical splash plates arranged upon said upper grill surface in spaced-apart parallel alignment to delineate multiple cooking zones, Upper plate means having front and rear edges, An insulation layer positioned below said plate means, A radiant heat source arranged below said insulation layer, A downwardly distending front plate joining said upper plate at the front edge thereof, said downwardly distending front plate resting in said grease trough, Outwardly projecting handle means arranged on the surface of said downwardly distending front plate, A guide plate distending downwardly from said upper plate from a position near its rear edge, A rear plate distending downwardly from said upper plate at its rear edge in a parallel relationship to said grill plate, the spatial separation between said grill plate and said rear plate being sufficient to sandwich said bar positioned above said horizontal grill plate at the rear edge thereof, Said radiant heat source adapted to be selectively positioned above a cooking zone by manipulation of said handle means in a direction transverse to the orientation of said spaced-apart vertical splash plates.

2. A device as set forth in claim 1 and, in addition, heating means positioned beneath the lower surface of said horizontal grill plate.

3. A device as set forth in claim 1 and, in addition, means for selectively varying the distance said radiant heat source is positioned above a cooking zone.

4. A device as set forth in claim 1 wherein the spatial relationship between said vertical front splash plate and said radiant heat source downwardly distending front plate is such that said radiant heat source and said horizontal grill plate upper cooking surface are not exposed to an operator selectively positioning said radiant heat source by manipulation of said handle means.

5. A device as set forth in claim 2 wherein said heating means positioned beneath the lower surface of said horizontal grill plate heats the upper surface of said horizontal grill plate to a temperature of approximately 350 degrees Fahrenheit.

6. A device as set forth in claim 1 wherein said radiant heat source heats the upper surface of articles placed upon said horizontal grill plate upper cooking surface to a temperature of at least 165 degrees Fahrenheit.

* * * * *